US009821710B1

(12) United States Patent
Salter et al.

(10) Patent No.: US 9,821,710 B1
(45) Date of Patent: Nov. 21, 2017

(54) LIGHTING APPARATUS FOR VEHICLE DECKLID

(71) Applicant: Ford Global Technologies, LLC, Dearborn, MI (US)

(72) Inventors: Stuart C. Salter, White Lake, MI (US); Paul Kenneth Dellock, Northville, MI (US); Christopher Charles Hunt, Livonia, MI (US); Doug H. Randlett, Metamora, MI (US); Chad Hoover, Washington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/152,988

(22) Filed: May 12, 2016

(51) Int. Cl.
| *B60Q 1/00* | (2006.01) |
| *B60Q 1/26* | (2006.01) |
| *B60Q 11/00* | (2006.01) |
| *B60Q 1/52* | (2006.01) |
| *H05B 37/02* | (2006.01) |
| *H05B 33/08* | (2006.01) |

(52) U.S. Cl.
CPC ........... *B60Q 1/52* (2013.01); *H05B 33/0857* (2013.01); *H05B 37/0227* (2013.01)

(58) Field of Classification Search
CPC .. B60Q 1/0029; B60Q 1/0035; B60Q 1/0041; B60Q 1/24; B60Q 1/26; B60Q 1/2603; B60Q 1/2607; B60Q 1/2611; B60Q 1/2615; B60Q 1/2623; B60Q 1/263; B60Q 1/2634; B60Q 1/2661; B60Q 1/2696; B60Q 1/30; B60Q 1/302; B60Q 1/34; B60Q 1/38; B60Q 1/382; B60Q 1/385; B60Q 1/44; B60Q 1/444; B60Q 1/447; B60Q 1/50; B60Q 1/503; B60Q 1/506; H05B 33/08; H05B 33/0803; H05B 33/0833; H05B 33/0842; H05B 33/0857; H05B 37/0227
USPC ......... 362/487, 496–499, 509–510, 540–545
See application file for complete search history.

(56) References Cited

U.S. PATENT DOCUMENTS

| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,350,049 B1 | 2/2002 | Zimmermann et al. |
| 6,419,854 B1 | 7/2002 | Yocom et al. |
| 6,494,490 B1 | 12/2002 | Trantoul |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle notification system is disclosed. The system comprises a light generating layer conforming to a surface of a decklid configured to enclose a storage compartment. The light generating layer comprises a plurality of LEDs in a semiconductor ink operable to emit a first emission. The system further comprises a controller configured to selectively activate the plurality of LEDs in response to a first signal from a decklid ajar indicator and a second signal from an emergency lighting module.

20 Claims, 6 Drawing Sheets

(56) References Cited

U.S. PATENT DOCUMENTS

| | | |
|---|---|---|
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,763,778 B2 | 7/2004 | Bergquist et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0300462 A1 | 10/2014 | Russ |
| 2014/0300463 A1 | 10/2014 | Russ |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0138818 A1 | 5/2015 | Salter et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | | |
|---|---|---|---|
| CN | 201193011 Y | 2/2009 | |
| CN | 204127823 U | 1/2015 | |
| DE | 3045685 A1 | 7/1982 | |
| DE | 4120677 A1 | 1/1992 | |
| DE | 29708699 U1 | 7/1997 | |
| DE | 20115800 U1 | 3/2002 | |
| DE | 10319396 A1 | 11/2004 | |
| EP | 1793261 A1 | 6/2007 | |
| EP | 2778209 A1 | 9/2014 | |
| GB | WO 2006095118 A1 * | 9/2006 | ........... B60Q 1/2696 |
| JP | 2000159011 A | 6/2000 | |
| JP | 2000280819 A | 10/2000 | |
| JP | 2007238063 A | 9/2007 | |
| KR | 20060026531 A | 3/2006 | |
| KR | 20140005735 A | 1/2014 | |
| WO | 2006047306 A1 | 5/2006 | |
| WO | 2014068440 A1 | 5/2014 | |

\* cited by examiner

LIGHTING APPARATUS FOR VEHICLE DECKLID

FIELD OF THE INVENTION

The present disclosure generally relates to a vehicle lighting apparatus, and more particularly, to a lighting apparatus for an emergency vehicle.

BACKGROUND OF THE INVENTION

Providing lighting for emergency vehicles may be implemented to provide various warnings and/or indications that an emergency vehicle is approaching. The disclosure provides for various embodiments of lighting systems that may improve safety, visibility, aesthetics, and/or features of the lighting for the emergency vehicles.

SUMMARY OF THE INVENTION

According to one aspect of the present disclosure, a vehicle notification system is disclosed. The system comprises a light generating layer conforming to a surface of a decklid configured to enclose a storage compartment. The light generating layer comprises a plurality of LEDs in a semiconductor ink operable to emit a first emission. The system further comprises a controller configured to selectively activate the plurality of LEDs in response to a first signal from a decklid ajar indicator and a second signal from an emergency lighting module.

According to another aspect of the present disclosure, a vehicle notification system is disclosed. The system comprises a light generating layer conforming to a surface of a decklid configured to enclose a storage compartment. The light generating layer comprises a plurality of LEDs in a semiconductor ink operable to emit a first emission. The system further comprises a controller configured to selectively activate the plurality of LEDs in response to a first signal from a decklid ajar indicator and a second signal from a turn indicator.

According to yet another aspect of the present disclosure, a vehicle notification system is disclosed. The system comprises a light generating layer conforming to a surface of a decklid. The decklid is configured to enclose a storage compartment. The light generating layer comprises a plurality of LEDs operable to selectively emit a first emission from a first portion and a second emission from a second portion. The first portion and the second portion form a plurality of alternating segments on the lighting generating layer.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein.

However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
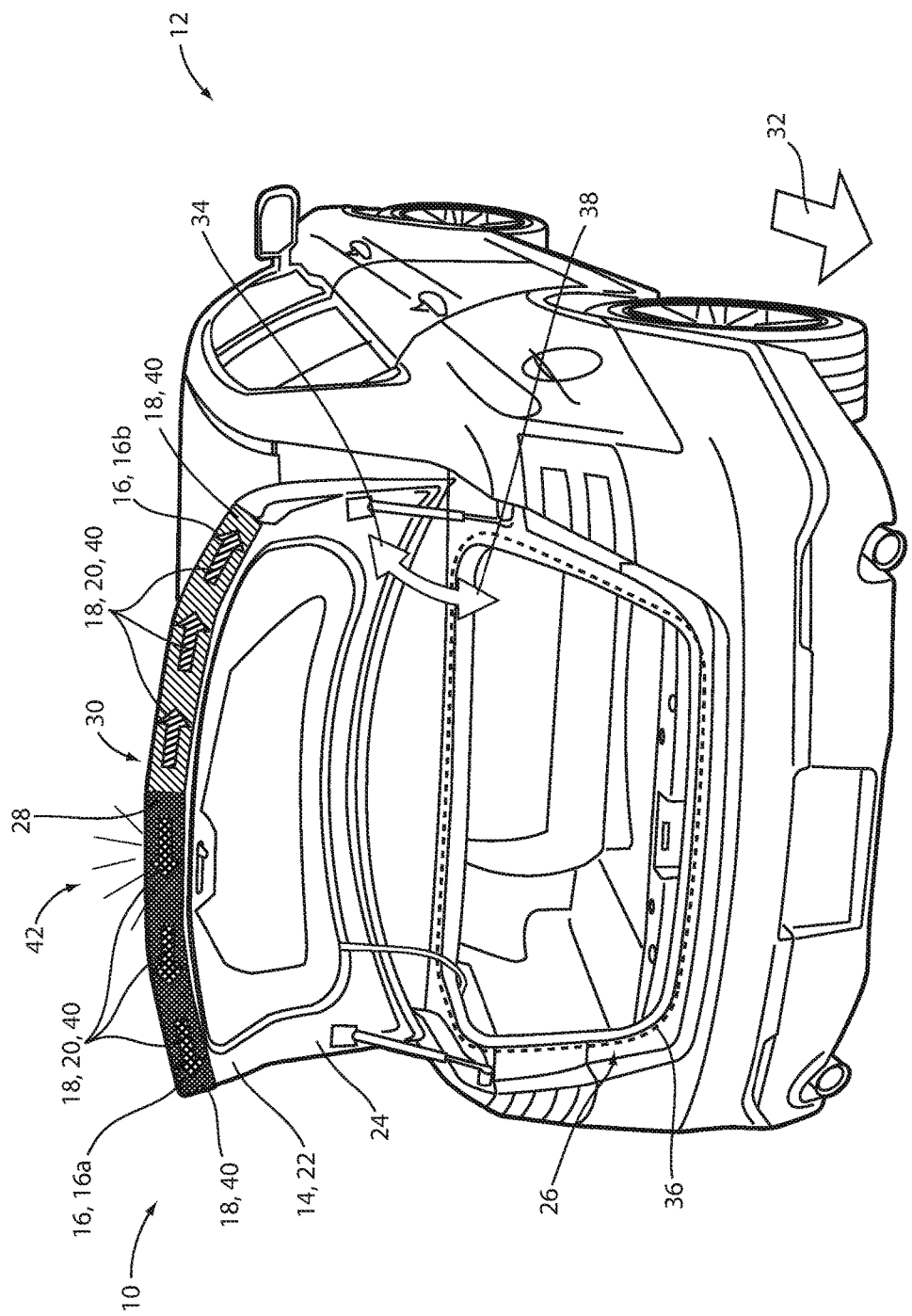
FIG. 1 is a rear perspective view of an automotive vehicle comprising an illumination apparatus disposed on a access door for a vehicle compartment.

Referring to FIG. 1, the disclosure describes an illumination apparatus 10 for a vehicle 12. The vehicle 12 may correspond to an emergency vehicle, first response vehicle, and/or any vehicle that may utilize auxiliary warning lights. Accordingly, the illumination apparatus 10 may correspond to one or more indicator lights disposed on a surface 14 of the vehicle 12. As demonstrated in the exemplary embodiments, the illumination apparatus 10 may be utilized to generate emissions of light in a variety of colors and may be utilized in various combinations to provide effective lighting for the vehicle 12. In some embodiments, one or more lighting portions 18 of the illumination apparatus 10 may correspond to directional indicators 16. The directional indicators may correspond to directional arrows 20. The directional indicators 16 may be configured as bi-directional indicators configured to project an output emission providing directional instructions.

In an exemplary embodiment, the illumination apparatus 10 may correspond to a substantially thin lighting assembly configured to be mounted to the surface 14 of the vehicle 12. The surface 14 may significantly align with a class-A surface of the vehicle 12. In this configuration, the illumination apparatus 10 may be configured to be mounted on the surface 14 without a conventional housing and also without a corresponding opening formed in a panel of the vehicle 12. In some embodiments, the illumination apparatus 10 may be disposed on an interior surface 22 of an access door 24 for a vehicle storage compartment 26.

In some embodiments, the access door 24 may correspond to a rear decklid or trunk lid configured to enclose the storage compartment 26. The illumination apparatus 10 may be disposed on an intermediate surface 28 between the interior surface 22 and an exterior surface 30 of the access door 24. In this configuration, the illumination apparatus may be directed in a rearward direction 32 relative the vehicle 12 when the access door 24 is arranged in an open configuration 34 as shown in FIG. 1. Additionally, the illumination apparatus 10 may be arranged proximate a perimeter edge 36 of the storage compartment 26 in a closed configuration 38. Accordingly, the illumination apparatus 10 may be configured to emit light in the rearward direction 32 when the access door 24 is arranged in the open configuration 34 and the illumination apparatus 10 may be hidden from view when the access door 24 is arranged in the closed configuration 38.

As referred to herein, a class-A surface of the vehicle 12 may correspond to an exposed surface that may typically be finished or painted. For example, a class-A surface may correspond to an exterior surface of any panel of the vehicle 12, which may be visible to an onlooker of the vehicle 12. A class-A surface may conversely not ordinarily apply to an unfinished surface of the vehicle 12 configured to accommodate a housing or other features that may not be visible in an assembled configuration. Though discussed in reference to a class-A surface or finished surface, the illumination apparatus 10 and the various corresponding light producing assemblies described herein may be utilized in connection with various surfaces of the vehicle 12.

Each of a plurality of lighting portions 18 or segments of the illumination apparatus 10 may correspond to a light producing assembly 40 corresponding to a thin, flexible lighting assembly. Each of the light producing assemblies 40 discussed herein may be configured to illuminate independently and may be configured to emit various colors of light. Accordingly, exemplary embodiments of the illumination apparatus 10 are discussed in detail in the following description. For purposes of this disclosure, a vehicle fixture or panel may refer to any interior or exterior piece of vehicle equipment, or a part thereof, suitable for receiving the illumination apparatus 10 as described herein. While the embodiments of the illumination apparatus 10 described herein are primarily directed to automotive vehicle use, it should be appreciated that the apparatus or system may also be implemented in other types of vehicles designed to transport one or more passengers such as, but not limited to, watercraft, aircraft, trains, mass transit, etc.

In some embodiments, the illumination apparatus 10 may comprise a controller configured to selectively illuminate each of a plurality of light producing assemblies 40 in response to one or more signals received from one or more sensors, vehicle modules, and/or inputs. For example, in some embodiments, a controller 112 may be configured to selectively activate one or more of the light producing assemblies 40 (e.g. the arrow 20) to produce an output emission 42 of light in response to a directional instruction. The directional instruction may correspond to an activation of a turn indicator while the access door 24 is in the open configuration 34. In such an example, the illumination apparatus 10 may form a directional indicator 16 selectively activated by the controller in response to a first signal from a turn indicator and a second signal from a decklid ajar indicator. The controller of the illumination apparatus 10 is discussed further in reference to FIGS. 5 and 6.

In response to the one or more sensors, vehicle modules, and/or inputs, the controller may be configured to activate a first directional indicator 16a or a second directional indicator 16b, which may correspond to the navigational direction of the vehicle 12. For example, the controller may be configured to receive a directional input from the turn indicator. Based on the directional input, the controller may selectively activate a corresponding directional indication of the first directional indicator 16a or the second directional indicator 16b. In this configuration, the illumination apparatus 10 may be applied for various applications to communicate a directional instruction of the vehicle 12.

Figure 2:
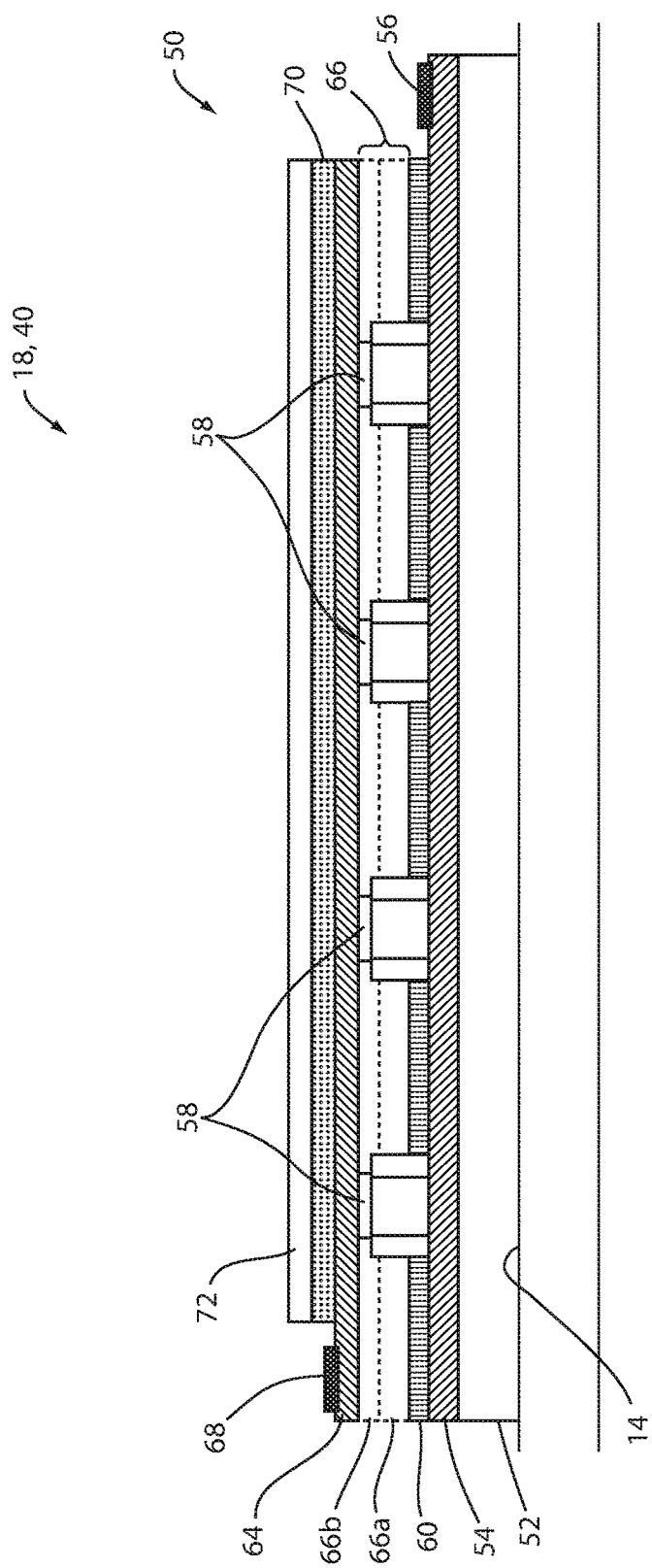
FIG. 2 is a detailed side view of a light producing assembly.

Referring to FIG. 2, the light producing assembly 40 may correspond to a thin-film or printed light emitting diode (LED) assembly. The light producing assembly 40 may comprise a circuit 50 having a substrate 52. The substrate 52 may be opaque, transparent, or semi-transparent and may be thin. The light producing assembly 40 may be utilized in a variety of applications, which may have a thin overall thickness. The substrate 52 may be of a polymer, for example polycarbonate, poly-methyl methacrylate (PMMA), polyethylene terephthalate (PET), etc. In some embodiments, the substrate 52 may be dispensed from a roll to provide for integration into assembly operations for the light producing assembly 40 and may be approximately 0.1 mm to 1.5 mm thick.

A first electrode 54 or conductive layer may be disposed on the substrate 52. The first electrode 54 and/or various electrodes or conductive layers discussed herein may comprise a conductive epoxy, such as a silver-containing or copper-containing epoxy. The first electrode 54 may be conductively connected to a first bus bar 56. The first bus bar 56 and other bus bars or conduits discussed herein may be of metallic and/or conductive materials, which may be screen printed on the electrodes or conductive layers. The bus bars may be utilized in the light producing assembly 40 to conductively connect a plurality of light-emitting diode (LED) sources 58 to a power source via the controller. In this way, the first bus bar 56, and other bus bars utilized in the light producing assembly, may be configured to uniformly deliver current along and/or across a surface of the light producing assembly 40.

The LED sources 58 may be printed, dispersed or otherwise applied to the first electrode 54 via a semiconductor ink 60. The semiconductor ink 60 may correspond to a liquid suspension comprising a concentration of LED sources 58 dispersed therein. The concentration of the LED sources may vary based on a desired emission intensity of the light producing assembly 40. The LED sources 58 may be dispersed in a random or controlled fashion within the semiconductor ink 60. The LED sources 58 may correspond to micro-LEDs of gallium nitride elements, which may be approximately 5 microns to 400 microns across a width substantially aligned with the surface of the first electrode 54. The semiconductor ink 60 may include various binding and dielectric materials including but not limited to one or more of gallium, indium, silicon carbide, phosphorous and/or translucent polymeric binders. In this configuration, the semiconductor ink 60 may contain various concentrations of LED sources 58 such that a surface density of the LED sources 58 may be adjusted for various applications.

In some embodiments, the LED sources 58 and semiconductor ink 60 may be sourced from Nth Degree Technologies Worldwide Inc. The semiconductor ink 60 can be applied through various printing processes, including ink jet and silk screen processes to selected portion(s) of the substrate 52. More specifically, it is envisioned that the LED sources 58 may be dispersed within the semiconductor ink 60, and shaped and sized such that a substantial quantity of them preferentially align with the first electrode 54 and a second electrode 64 during deposition of the semiconductor ink 60. The portion of the LED sources 58 that ultimately are electrically connected to the electrodes 54, 64 may be illuminated by a voltage source applied across the first electrode 54 and the second electrode 64. In some embodiments, a power source derived from a vehicular power source may be employed as a power source to supply current to the LED sources 58. Additional information regarding the construction of a light producing assembly similar to the light producing assembly 40 is disclosed in U.S. Pat. No. 9,299,887 A1 to Lowenthal et al., entitled "ULTRA-THIN PRINTED LED LAYER REMOVED FROM SUBSTRATE," filed Mar. 12, 2014, the entire disclosure of which is incorporated herein by reference.

At least one dielectric layer 66 may be printed over the LED sources 58 to encapsulate and/or secure the LED sources 58 in position. The at least one dielectric layer 66 may correspond to a first dielectric layer 66a and a second dielectric layer 66b, which may be of a substantially transparent material. The second electrode 64 may correspond to a top transparent conductive layer printed over the dielectric layer 66 to electrically connect the electrodes 54, 64. The second electrode 64 may be conductively connected to a second bus bar 68. The bus bars 56, 68 may be utilized in the light producing assembly 40 to conductively connect a plurality of LED sources 58 to the power source via the controller. Though the plurality of LED sources 58 are discussed as connected to the controller via the bus bars 56, 68, in some embodiments, the controller may supply current to the LED sources 58 via various forms of conductive leads or traces configured to conductively connect the controller to the first electrode 54 and the second electrode 64. An exemplary embodiment of the controller is discussed in reference to FIG. 5.

In some embodiments, the first electrode 54 and the second electrode 64 may correspond to an anode electrode and a cathode electrode. Though described as an anode and a cathode of the light producing assembly 40, the first electrode 54 and the second electrode 64 may be arranged such that the second electrode 64 (cathode) is disposed on the substrate and the first electrode 54 (anode) is disposed on the at least one dielectric layer 66. Additionally, a reflective layer which may be of a metallic reflective material may be disposed between the substrate 52 and the first electrode 54 to reflect light emitted from the cathode outward from the substrate 52 through the second electrode 64. The bus bars 56, 68 may be printed along opposite edges of the electrodes 54, 64 and electrically terminate at anode and cathode terminals. Points of connection between the bus bars 56, 68 and the power source may be at opposite corners of each bus bar 56, 68 for uniform current distribution along each bus.

Still referring to FIG. 2, in some embodiments, a photoluminescent layer 70 may be applied to the second electrode 64 to form a backlit configuration of the light producing assembly 40. In some embodiments, the photoluminescent layer 70 may alternatively or additionally be configured in a front-lit configuration. The photoluminescent layer 70 may be applied as a coating, layer, film, and/or photoluminescent substrate to the second electrode 64 or any surface of the light producing assembly 40 configured to emit the output emission 42 therethrough. The photoluminescent layer 70 may be applied by screen printing, flexography, and/or otherwise affixed to the second electrode 64 or a portion of a fixture or panel of the vehicle 12.

In various implementations, the LED sources 58 may be configured to emit an excitation emission comprising a first wavelength corresponding to blue light. The LED sources 58 may be configured to emit the excitation emission into the photoluminescent layer 70 such that the photoluminescent material becomes excited. In response to the receipt of the excitation emission, the photoluminescent material converts the excitation emission from the first wavelength to the output emission 42 comprising at least a second wavelength longer than the first wavelength. Additionally, one or more coatings 72 or sealing layers may be applied to an exterior surface of the light producing assembly 40 to protect the photoluminescent layer 70 and various other portions of the light producing assembly 40 from damage and wear.

Figure 3:
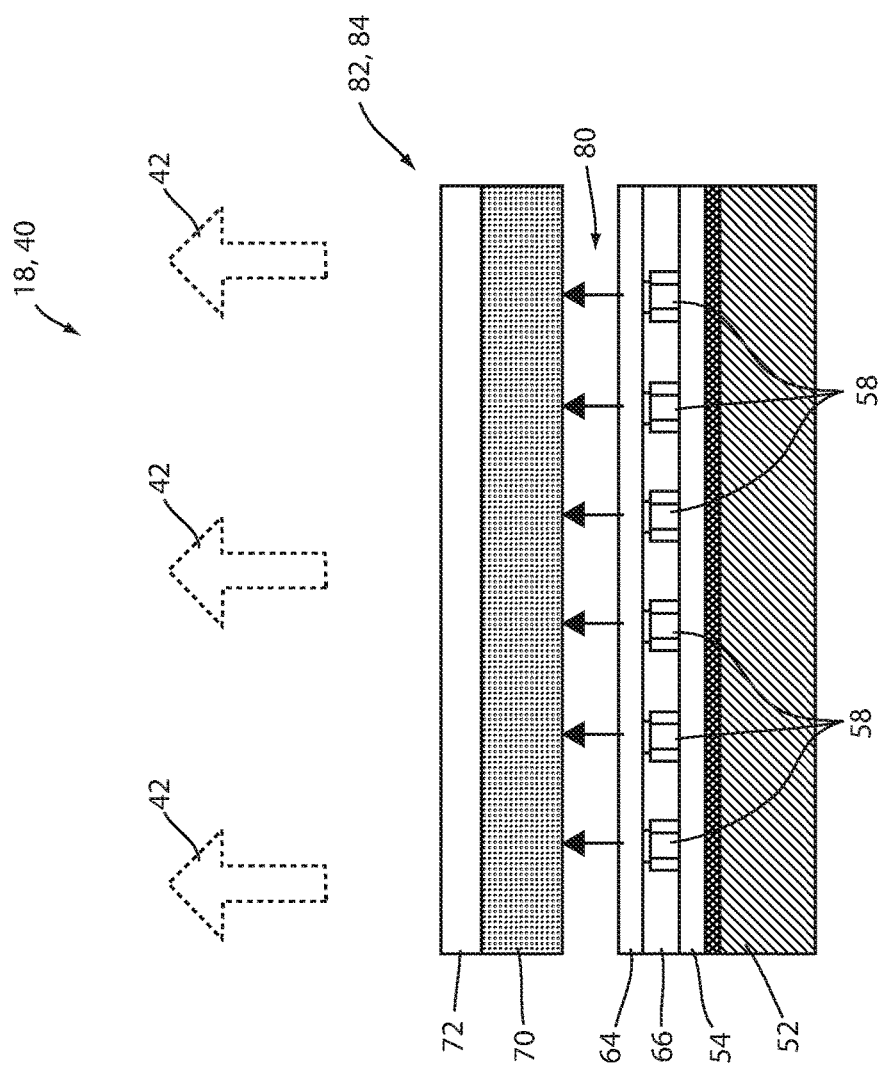
FIG. 3 is a side schematic view of a light producing assembly demonstrating a photoluminescent layer configured to convert a wavelength of light.

Referring now to FIG. 3, a detailed view of photoluminescent layer 70 of the light producing assembly 40 in a backlit configuration is shown. The light producing assembly 40 is configured similar to the light producing assembly 40 demonstrated in FIG. 2, with like-numbered elements having the same or comparable function and structure. Though not shown in FIG. 3, the LED sources 58 are in electrical communication with the bus bars 56, 68 and a power source via the controller such that the controller may selectively activate an excitation emission 80 from LED sources 58.

In an exemplary implementation, the excitation emission 80 may comprise a first wavelength corresponding to a blue, violet, and/or ultra-violet spectral color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In operation, the excitation emission 80 is transmitted into an at least partially light transmissive material of the photoluminescent layer 70. The excitation emission 80 is emitted from the LED sources 58 and may be configured such that the first wavelength corresponds to at least one absorption wavelength of one or more photoluminescent materials disposed in the photoluminescent layer 70. For example, the photoluminescent layer 70 may comprise an energy conversion layer 82 configured to convert the excitation emission 80 at the first wavelength to an output emission 42 having a second wavelength, different from the first wavelength. The output emission 42 may comprise one or more wavelengths, one of which may be longer than the first wavelength. The conversion of the excitation emission 80 to the output emission 42 by the energy conversion layer 82 is referred to as a Stokes shift.

In some embodiments, the output emission 42 may correspond to a plurality of wavelengths. Each of the plurality of wavelengths may correspond to significantly different spectral color ranges. For example, the at least second wavelength of the output emission 42 may correspond to a plurality of wavelengths (e.g. second, third, etc.). In some implementations, the plurality of wavelengths may be combined in the output emission 42 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm. In some implementations, a blue or blue green wavelength may correspond to the excitation emission being combined with the output emission 42. As discussed herein, a concentration of the photoluminescent material may be configured to allow at least a portion of the excitation emission 80 to be emitted with the output emission 42 to add a blue hue to the output emission 42. The plurality of wavelengths may be utilized to generate a wide variety of colors of light from the each of the photoluminescent portions converted from the first wavelength. Though the particular colors of red, green, and blue are referred to herein, various photoluminescent materials may be utilized to generate a wide variety of colors and combinations to control the appearance of the output emission 42.

The photoluminescent materials, corresponding to the photoluminescent layer 70 or the energy conversion layer 82, may comprise organic or inorganic fluorescent dyes configured to convert the excitation emission 80 to the output emission 42. For example, the photoluminescent layer 70 may comprise a photoluminescent structure of rylenes, xanthenes, porphyrins, phthalocyanines, or other materials suited to a particular Stokes shift defined by an absorption range and an emission fluorescence. In some embodiments, the photoluminescent layer 70 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission 80 configured to excite one or more photoluminescent materials to emit an output emission having a desired color.

Still referring to FIG. 3, the light producing assembly 40 may further include the coating 72 as at least one stability layer configured to protect the photoluminescent material contained within the energy conversion layer 82 from photolytic and/or thermal degradation. The stability layer may be configured as a separate layer optically coupled and adhered to the energy conversion layer 82. The stability layer may also be integrated with the energy conversion layer 82. The photoluminescent layer 70 and/or the one or more coatings 72 may also include a protection layer optically coupled and adhered to the stability layer or any layer or coating to protect the photoluminescent layer 70 from physical and chemical damage arising from environmental exposure.

The stability layer and/or the protection layer may be combined with the energy conversion layer 82 to form an integrated photoluminescent structure 84 through sequential coating or printing of each layer, or by sequential lamination or embossing. Additionally, several layers may be combined by sequential coating, lamination, or embossing to form a substructure. The substructure may then be laminated or embossed to form the integrated photoluminescent structure 84. Once formed, the photoluminescent structure may be applied to a surface of at least one of the electrodes 54, 64 such that the excitation emission 80 received from the LED sources 58 may be converted to the output emission 42. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 4:
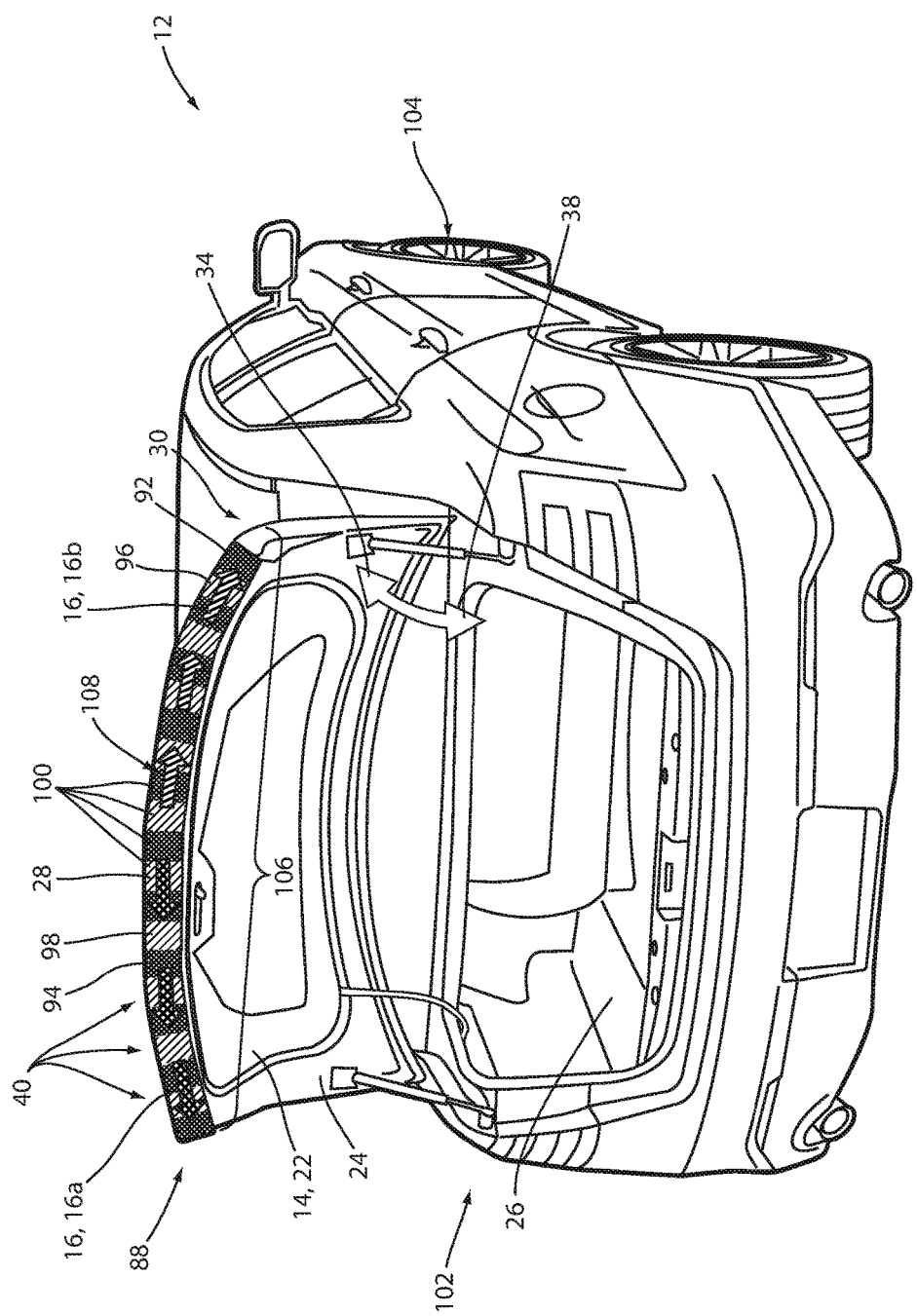
FIG. 4 is a rear perspective view of an automotive vehicle demonstrating an illumination apparatus.

Referring now to FIG. 4, a rear perspective view of the vehicle 12 is shown demonstrating an embodiment of the illumination apparatus 88. As demonstrated in FIG. 4, in some embodiments, the illumination apparatus 88 may comprise a plurality of lighting portions 18 or light producing assemblies 40 arranged along the interior surface 22 and/or the intermediate surface 28 of the access door 24. Each of the light producing assemblies 40 may be independently activated by the controller and may be configured to emit light in alternating colors. For example, a first portion 92 of the light producing assemblies 40 may be configured to emit light in a first color 94, and a second portion 96 of the light producing assemblies 40 may be configured to emit light in a second color 98.

Each of the portions 92 and 96 may comprise the light producing assemblies 40 arranged in alternating strips 100 extending substantially from a driver side 102 to a passenger side 104 of the vehicle 12. The first portion 92 is demonstrated as a first fill pattern and the second portion 96 is demonstrated by a second fill pattern on the intermediate surface 28. Accordingly, the first fill pattern and the second fill pattern are labeled for clarity. As demonstrated in FIG. 4, each of the portions 92 and 96 may be configured to extend from across a width 106 of the access door 24 extending from the driver side 102 to the passenger side 104. In some embodiments, the portions may also be disposed on the interior surface 22 of the access door 24 (e.g. the trunk lid or rear decklid). The driver's side 102 and the passenger side 104 may vary based on a geographic reference for an application of the illumination apparatuses discussed herein.

In some embodiments, the alternating strips 100 of each of the portions 92 and 96 may be sufficiently narrow that an emitting surface 108 of the illumination apparatus 88 may appear to illuminate consistently in the first color 94 or the second color 98. The illumination in the first color 94 or the second color 96 may correspond to the selective activation of the first portion 92 or the second portion 96 of the light producing assemblies, respectively. The consistency of the illumination across the width 106 of the emitting surface 108 may be dependent on a spacing or frequency of the alternating strips 100 and a distance from which the emitting surface 108 is viewed. Though the spacing may affect the apparent consistency of the illumination of the emitting surface 108 across the width 106 of the access door 24, during typical operation, the illumination apparatus will be viewed from far off distances exceeding 5 m (e.g. distances corresponding to approaching vehicles). Accordingly, the controller of the illumination apparatus 88 may be configured to provide the effect of illuminating the entire emitting surface 108 in the first color 94 or the second color 98.

Figure 5:
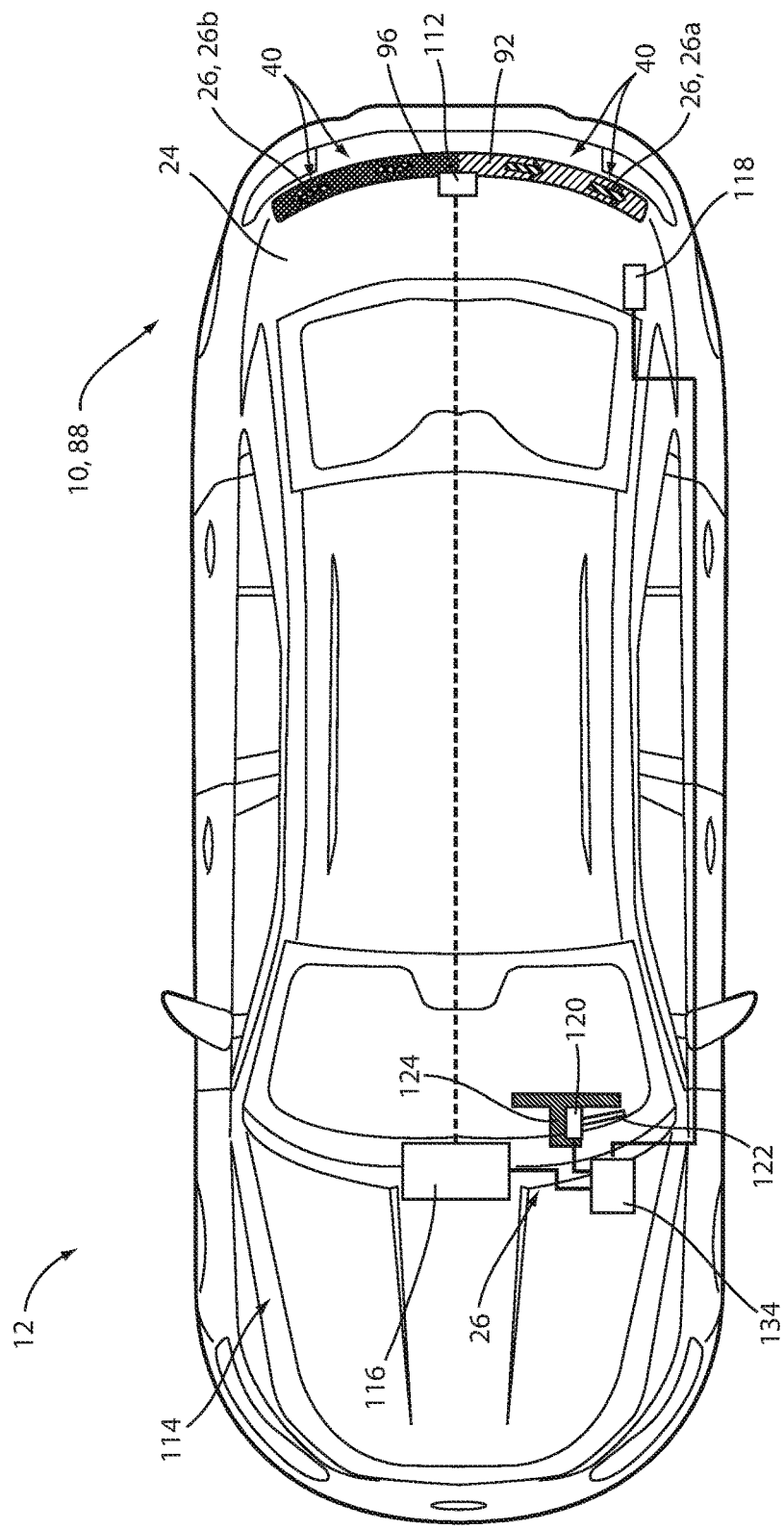
FIG. 5 is a top schematic view of a vehicle demonstrating a vehicle notification system comprising an illumination apparatus.

Referring now to FIGS. 4 and 5, the illumination apparatus 88 is further discussed. For clarity, the disclosure describes the present exemplary embodiment in reference to the illumination apparatus 88. As demonstrated in FIG. 5, the first portion 92 and the second portion 96 are shown as a two portions instead of the alternating stripes 100 for clarity. Though demonstrated as a specific embodiment, the various systems and apparatuses described herein may be utilized in various combinations. Accordingly, the disclosure provides for a flexible solution that may be modified to suit various applications without departing from the spirit of the disclosure.

In some embodiments, the illumination apparatus 88 may be activated by the controller 112 in response to receiving a signal identifying an activation of an emergency lighting system 114 in combination with an indication that the access door 24 is ajar. The emergency lighting system 114 may be selectively activated in response to an input to a user interface of an emergency lighting module 116. Accordingly, the controller 112 may be configured to receive one or more signals from the emergency lighting module 116 identifying that the emergency lighting system 114 is active. In this way the controller 112 may activate the illumination apparatus 88 to emit light from the first portion 92 or the second portion 96 in response to a signal identifying the activation of the emergency lighting system 114. The emergency lighting module 116 is further discussed in reference to FIG. 6 and may correspond to a system configured to control one or more flashing lights, sirens, alarms, and various forms of alert systems of the vehicle 12.

The controller 112 may further be in communication with a decklid ajar indicator 118 configured to identify when the access door 24 is ajar. The decklid ajar indicator 118 may correspond to one or more sensors configured to detect a position of the access door 24. The decklid ajar indicator 118 may correspond to one or more mechanical or electromechanical switches configured to identify the access door 24 in an open configuration 34. The decklid ajar indicator 118 may similarly be configured to identify that the access door 24 is ajar or not in the closed configuration 38.

In response to an ajar signal from the decklid ajar indicator 118 and the emergency lighting module 116 identifying that the access door 24 is ajar and the emergency lighting system 114 is active, the controller 112 may activate the illumination apparatus 88 to emit light from the first portion 92 or the second portion 96. The combination of input signals to the controller 112 from the emergency lighting module 116 and the decklid ajar indicator 118 may identify that the access door 24 is arranged in the open configuration 34 and indicate the emergency lighting is active. Accordingly, the controller 112 may respond by activating the illumination apparatus 88 to emit light from the first portion 92 and/or the second portion.

The illumination apparatus 88 may comprise the first directional indicator 16a and the second directional indicator 16b. Accordingly, the controller 112 may selectively activate each of the directional indicators 16a and 16b in response to a navigational signal or turn signal from the turn indicator 120. The turn indicator 120 may correspond to a turn a switch in connection with a stalk 122 of a steering column 124 configured to detect a turning input from an operator of the vehicle 12. In this way, the controller 112 may selectively activate the directional indicators 16 in response to a signal from the turn indicator 120 in combination with the ajar signal from the decklid ajar indicator 118. Accordingly, the illumination apparatus 10 may be applied for various applications to communicate a directional instruction of the vehicle 12.

Figure 6:
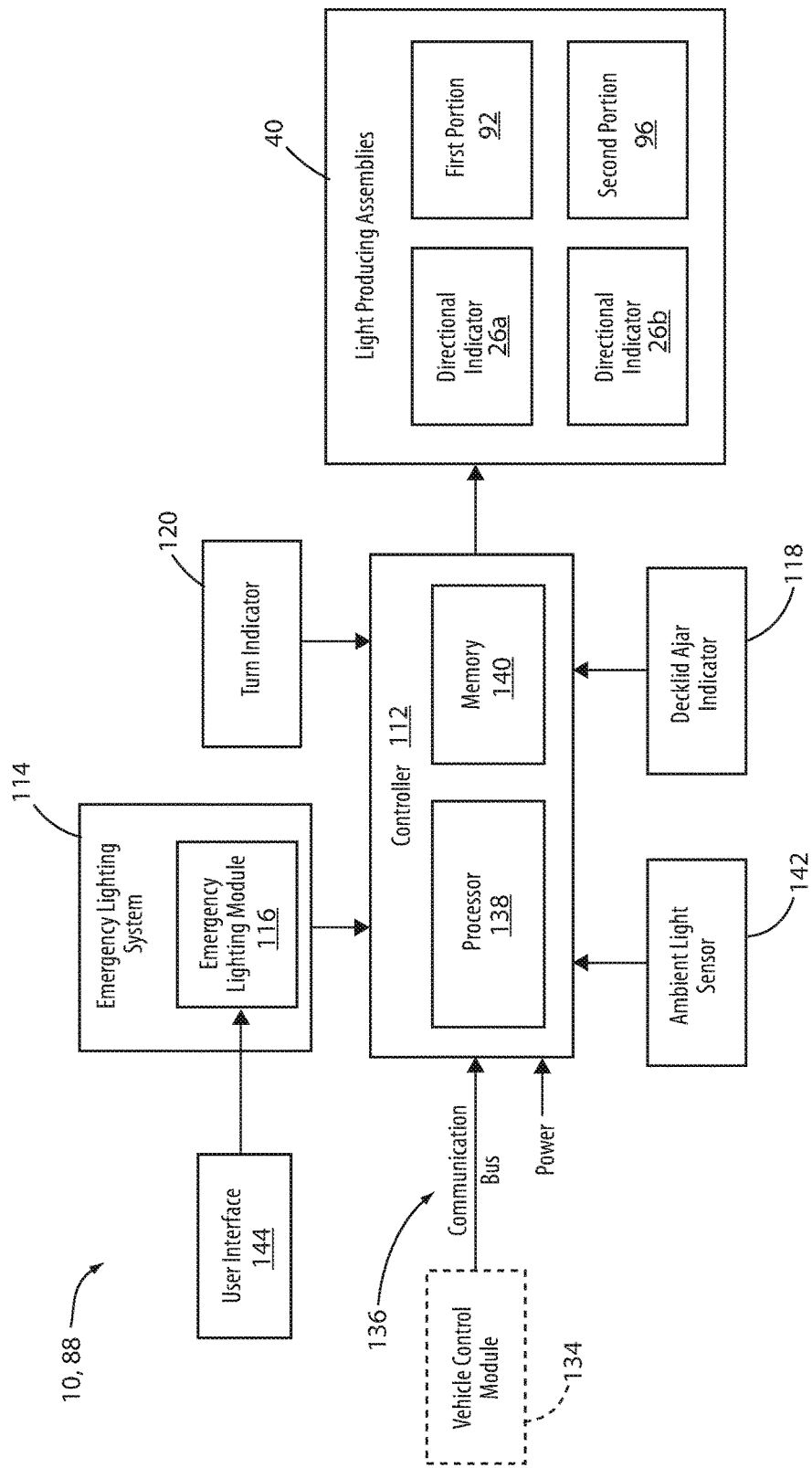
FIG. 6 is a block diagram of an illumination apparatus in accordance with the disclosure.

Referring to FIG. 6, a block diagram demonstrating the illumination apparatus 10 is shown. The controller 112 may be in communication with the light producing assemblies 40, via the bus bars 56 and 68 discussed herein. The controller 112 may be in communication with the vehicle control module 134 via a communication bus 136 of the vehicle 12. The communication bus 136 may be configured to deliver signals to the controller 112 identifying various vehicle states. For example, the communication bus 136 may be configured to communicate to the controller 112 a drive selection of the vehicle 12, an ignition state, a door open or ajar status, a lighting state, a braking condition, vehicle velocity or speed, a remote activation of the illumination apparatus 10, or any other information or control signals that may be utilized to activate one or more of the light producing assemblies 40 of the illumination apparatus 10. Though the controller 112 is discussed herein, in some embodiments, at least a portion of the illumination apparatus 10 may be activated in response to an electrical or electromechanical switch of the vehicle 12.

The controller 112 may comprise a processor 138 comprising one or more circuits configured to receive the signals from the communication bus 136 and output signals to control the illumination apparatus 10 to control the various output lights, emissions, indications, etc. as discussed herein. The processor 138 may be in communication with a memory 140 configured to store instructions to control the activation of the illumination apparatus 10. The controller 112 may further be in communication with an ambient light sensor 142. The ambient light sensor 142 may be operable to communicate a light condition, for example a level brightness or intensity of the ambient light proximate the vehicle 12. In response to the level of the ambient light, the controller 112 may be configured to adjust a light intensity of the output emission 42 from each of the light producing assemblies, layers, emitters, and/or light source discussed herein. The intensity of the light output from the illumination apparatus 10 may be adjusted by the controller 112 by controlling a duty cycle, current, or voltage supplied to the illumination apparatus 10.

The controller 112 may be in communication with emergency lighting module 116 of the emergency lighting system 114. The emergency lighting system 114 may be selectively activated in response to an input to a user interface 144 of an emergency lighting module 116. Accordingly, the controller 112 may be configured to receive one or more signals from the emergency lighting module 116 identifying that the emergency lighting system 114 is active. In this way the controller 112 may activate the illumination apparatuses 10 and 88 to emit light from the first portion 92 or the second portion 96 in response to a signal identifying the activation of the emergency lighting system 114. The emergency lighting module 116 may correspond to a system configured to control one or more flashing lights, sirens, alarms, and various forms of alert systems.

The controller 112 may further be in communication with the decklid ajar indicator 118 configured to identify when the access door 24 is ajar. The decklid ajar indicator 118 may correspond to one or more sensors configured to detect a position of the access door 24. The decklid ajar indicator 118 may correspond to one or more mechanical or electromechanical switches configured to identify the access door 24 in an open configuration 34. For example, the decklid ajar indicator 118 may correspond to an electromechanical switch, a proximity switch, or various forms of devices that may detect a proximity or orientation of the access door.

In some embodiments, the illumination apparatuses 10 and 88 may comprise the first directional indicator 16a and the second directional indicator 16b. Accordingly, the controller 112 may selectively activate each of the directional indicators 16a and 16b in response to a navigational signal or turn signal from the turn indicator 120. The turn indicator 120 may correspond to a turn a switch in connection with a stalk 122 of a steering column 124 configured to detect an input from an operator indicating an approaching turn of the vehicle 12. In this way, the controller 112 may selectively activate the directional indicators 16 in response to a signal from the turn indicator 120 in combination with the ajar signal from the decklid ajar indicator 118. In this configuration, the illumination apparatus 10 may be applied for various applications to communicate a directional instruction.

As described herein, the illumination apparatuses 88 may be configured in various ways to communicate an emergency status and/or directional instructions for the vehicle 12. The various embodiments may generally provide for a visual communication system configured to communicate warnings or instructions that may promote safe operation of various types of vehicles. Particularly, the illumination apparatuses 10 and 88 may provide for illumination systems for rear decklids or access doors for cargo compartments of emergency vehicles.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle notification system comprising:
   a light generating layer conforming to a surface of a decklid configured to enclose a storage compartment and comprising a plurality of LEDs in a semiconductor ink operable to emit a first emission; and
   a controller configured to selectively activate the plurality of LEDs in response to a first signal from a decklid ajar indicator and a second signal from an emergency lighting module.

2. The notification system according to claim 1, wherein the interior surface corresponds to an interior surface rearward directed in an open position.

3. The notification system according to claim 1, wherein the light generating layer further comprises a plurality of electrodes and the plurality of LEDs are disposed between the electrodes.

4. The notification system according to claim 3, wherein the plurality of LEDs is applied as a printed layer to a first electrode of the plurality of electrodes.

5. The notification system according to claim 1, wherein the light generating layer comprises a first portion configured to output the first emission and a second portion configured to output a second emission.

6. The notification system according to claim 5, wherein the controller is configured to selectively activate each of the first portion and the second portion to output the first emission and the second emission independently.

7. The notification system according to claim 1, wherein the emergency lighting module corresponds to a controller for an emergency lighting system.

8. A vehicle notification system comprising:
   a light generating layer conforming to a surface of a decklid configured to enclose a storage compartment and comprising a plurality of LEDs in a semiconductor ink operable to emit a first emission; and
   a controller configured to selectively activate the plurality of LEDs in response to a first signal from a decklid ajar indicator and a second signal from a turn indicator.

9. The notification system according to claim 8, wherein the interior surface corresponds to an interior surface rearward directed in an open position.

10. The notification system according to claim 8, wherein the light generating layer comprises a first portion configured to output the first emission and a second portion configured to output a second emission.

11. The notification system according to claim 10, wherein the first portion corresponds to a first turn indicator and the second portion corresponds to a second turn indicator.

12. The notification system according to claim 10, wherein the light generating layer further comprises a third portion.

13. The notification system according to claim 12, wherein the controller is further configured to selectively activate the third portion in response to the first signal and a third signal from an emergency lighting module.

14. The notification system according to claim 13, wherein the light generating layer further comprises a fourth portion, and wherein the third portion is configured to emit a third emission and the fourth portion is configured to emit a fourth emission.

15. The notification system according to claim 14, wherein the third emission and the fourth emission correspond to different colors.

16. A vehicle notification system comprising:
    a light generating layer conforming to a surface of a decklid configured to enclose a storage compartment and comprising a plurality of LEDs in a semiconductor ink operable to selectively emit a first emission from a first portion and a second emission from a second portion, wherein the first portion and the second portion form a plurality of alternating segments on the light generating layer, whereby the plurality of LEDs are operable to emit a decklid ajar indicator.

17. The notification system according to claim 16, further comprising a controller configured to selectively activate the first portion and the second portion independently.

18. The notification system according to claim 16, wherein the controller is in communication with an emergency lighting module and configured to alternately activate the first portion and the second portion to illuminate the light generating layer in a first color or a second color.

19. The notification system according to claim 16, wherein the alternating segments are arranged and proportioned such that the first emission appears to illuminate substantially the entire light generating layer.

20. The notification system according to claim 19, wherein the controller is further operable to activate both the first emission and the second emission to illuminate the light generating layer in a third color as a combination of the first color and the second color.

* * * * *